US009582667B2

(12) United States Patent
Hay et al.

(10) Patent No.: US 9,582,667 B2
(45) Date of Patent: Feb. 28, 2017

(54) DETECTING VULNERABILITY TO RESOURCE EXHAUSTION

(71) Applicant: GLOBALFOUNDRIES INC., Grand Cayman (KY)

(72) Inventors: Roee Hay, Haifa (IL); Roi Saltzman, Rishon Le Zion (IL); Omer Tripp, Bronx, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 342 days.

(21) Appl. No.: 14/040,819

(22) Filed: Sep. 30, 2013

(65) Prior Publication Data

US 2015/0096032 A1   Apr. 2, 2015

(51) Int. Cl.
 H04N 7/16   (2011.01)
 G06F 21/57   (2013.01)
 H04L 29/06   (2006.01)

(52) U.S. Cl.
 CPC ........ G06F 21/577 (2013.01); H04L 63/1416 (2013.01); H04L 63/1433 (2013.01)

(58) Field of Classification Search
 None
 See application file for complete search history.

(56) References Cited

U.S. PATENT DOCUMENTS

| 8,341,727 B2 | 12/2012 | Worley, Jr. et al. | |
| 2008/0072214 A1* | 3/2008 | Peyton et al. | 717/133 |
| 2008/0244536 A1* | 10/2008 | Farchi et al. | 717/130 |
| 2009/0114827 A1* | 5/2009 | Burbar et al. | 250/363.09 |
| 2009/0144827 A1* | 6/2009 | Peinado et al. | 726/25 |
| 2010/0058475 A1* | 3/2010 | Thummalapenta et al. | 726/25 |
| 2011/0302455 A1* | 12/2011 | Thomas et al. | 714/45 |
| 2013/0211762 A1* | 8/2013 | Taskov | 702/88 |
| 2014/0047538 A1* | 2/2014 | Scott et al. | 726/22 |

OTHER PUBLICATIONS

Antunes et al., "Detection and Prediction of Resource-Exhaustion Vulnerabilities", 19th International Symposium on Software Reliability Engineering ISSRE 2008, pp. 87-96.

Chang et al., "Inputs of Coma: Static Detection of Denial-of-Service Vulnerabilities", 22nd IEEE Computer Security Foundations Symposium, CSF 2009, pp. 186-199.

(Continued)

*Primary Examiner* — Isaac T Tecklu
(74) *Attorney, Agent, or Firm* — Anthony J. Canale

(57) ABSTRACT

In an aspect of managing resource exhaustion, a method includes receiving a program code that is configured for generating a random number. The generating is identified as vulnerable to a resource exhaustion. The method also includes identifying a statement in the program code at which a value of a variable associated with the generating of the random number is affected, inserting a hooking code in the statement for monitoring the variable at the statement, and running the program code in a plurality of iterations. A consumption level of the resource is varied in the plurality of iterations. The method further includes monitoring a plurality of values of the variable in the plurality of iterations. The method also includes executing a regression analysis on the plurality of values and returning a root cause of the vulnerability.

14 Claims, 3 Drawing Sheets

(56) References Cited

OTHER PUBLICATIONS

CWE, "Uncontrolled Resource Consumption ('Resource Exhaustion')". 2013. Can be found at : http://cwe.mitre.org/data/definitions/400.html; 5 pages.
Groza et al., "Formal Modeling and Automatic Detection of Resource Exhaustion Attacks", Proceedings of the 6th ACM Symposium on Information, Computer and Communications Security, ASIACCS 2011, pp. 326-333.

\* cited by examiner

DETECTING VULNERABILITY TO RESOURCE EXHAUSTION

BACKGROUND

The present invention relates generally to information systems, and more specifically, to security and maintainability of information systems.

The operation of a computerized device, system or network is typically dependent on resources. Such resources may be memory, hard disk, sensors communication ports and the like.

In some cases the resources are exhausted. Such a case may be a denial of service attack which is an attempt to make a machine or network resource unavailable to its intended users. This denial of service can decrease service availability, causing issues for customers and providers.

SUMMARY

According to an embodiment, there is provided a computer-implemented method for managing resource exhaustion. The method includes receiving a program code that is configured for generating a random number. The generating is identified as vulnerable to a resource exhaustion. The method also includes identifying a statement in the program code at which a value of a variable associated with the generating of the random number is affected and inserting a hooking code in the statement. The hooking code is configured for monitoring the variable at the statement. The method further includes running the program code in a plurality of iterations. A consumption level of the resource is varied in the plurality of iterations. The method further includes monitoring; by the hooking code, a plurality of values of the variable in the plurality of iterations, as a result of the running, and executing a regression analysis on the plurality of values. The regression analysis results in an entropy number. The method also includes comparing the entropy number to an expected level of entropy; and returning an identification of the statement as a result of identifying the entropy number as being not within the expected level of entropy, and returning a root cause of the vulnerability.

According to some other embodiments there is provided a computer-implemented method for managing resource exhaustion. The method includes receiving a program code that is configured for generating a random number. The generating is associated with a characteristic of a resource. The method also includes running the program code in a plurality of iterations. A consumption level of the resource is varied in the plurality of iterations. The method further includes executing a regression analysis on a plurality of random values generated in the plurality of iterations. The regression analysis results in an entropy value. The method also includes comparing the entropy value to an expected level of entropy, and identifying the generation of the random number as being vulnerable to exhaustion of the resource as a result of identifying the entropy value as not being within the expected level of entropy.

According to some embodiments there is provided a computer program product for managing resource exhaustion. The computer program product includes a computer readable storage medium having program code embodied therewith. The program code is executable by a computer to perform a method. The method includes receiving a program code that is configured for generating a random number. The generating is identified as vulnerable to a resource exhaustion. The method also includes identifying a statement in the program code at which a value of a variable associated with the generating of the random number is affected, and inserting a hooking code in the statement. The hooking code is configured for monitoring the variable at the statement. The method also includes running the program code in a plurality of iterations. A consumption level of the resource is varied in the plurality of iterations. The method further includes monitoring a plurality of values of the variable in the plurality of iterations, as a result of the running, and executing a regression analysis on the plurality of values. The regression analysis results in an entropy number. The method further includes comparing the entropy number to an expected level of entropy, and returning an identification of the statement as a result of identifying the entropy number as being not within the expected level of entropy, and returning a root cause of the vulnerability.

BRIEF DESCRIPTION OF THE SEVERAL VIEWS OF THE DRAWINGS

The description of the illustrative embodiments is to be read in conjunction with the accompanying drawings, wherein.

DETAILED DESCRIPTION

Figure 1:
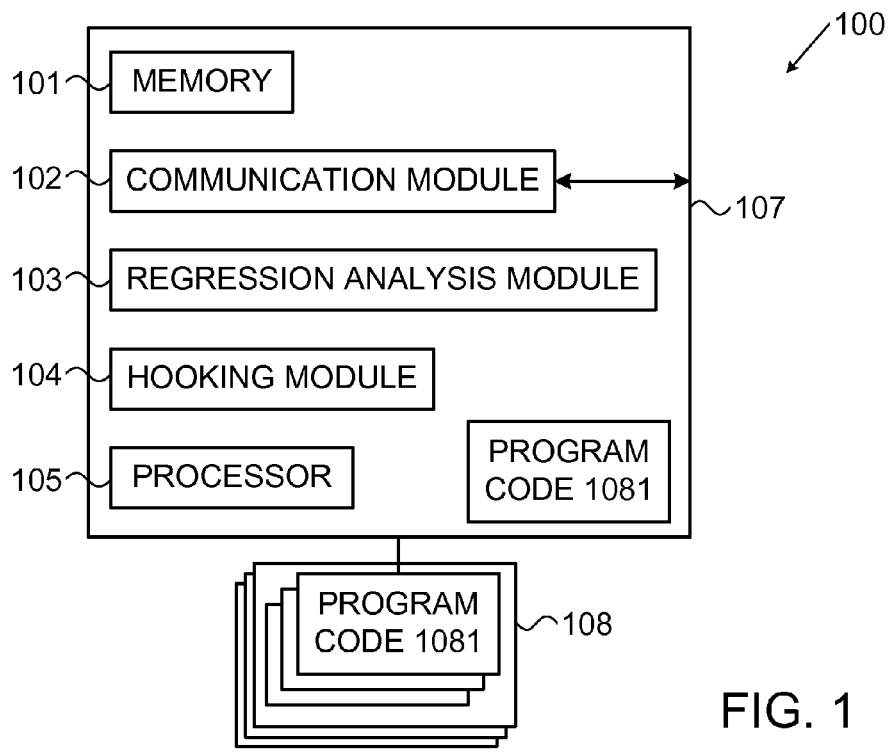
FIG. 1 shows a block diagram of a system for detecting the vulnerability of random number generation to resource exhaustion and for identifying a root cause in the program code for the vulnerability, in accordance with some exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc. or any suitable combination of the above. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams going and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments include a technique to identify cases in which generation of a random number by a program code is vulnerable to resource exhaustion. A low level of entropy of a random number may cause an attacker to guess the next manipulated random number with a high probability, enabling attacks, such as DNS (Domain Name System) poisoning. In some embodiments, the random number is generated according to constrains and/or rules and/or parameters associated with a resource. The resource may be memory, input/output ports, hard drives, sensors and the like. The random number may be used, for example, for selecting the resource. In such a case the random number may be generated, inter alia, according to constraints associated with the number of available instances of the resource. In some cases the random number is used for cryptography. An example of such a random number generator is a random number used by the DNS resolver that is chosen from the available source ports. For example, the DNS resolver can decide that if it fails in generating the random number which is associated with a port, then it delegates the random number generation to a different, inferior algorithm.

The embodiments described herein apply regression analysis on the random numbers generated by the different runs of the program code for different levels of consumption of resources. The regression analysis is used for checking the distribution of the generated random numbers as a function of the level of resource consumption. If such a distribution (entropy level) is below a certain threshold, the generation of the random number is identified as vulnerable to resource exhaustion.

The embodiments described herein include techniques to eliminate or decrease the vulnerability of the random number generation to resource exhaustion.

The embodiments described herein further identify the root cause of the vulnerability. The root cause includes the statement of the program code at which the random number is affected. In some embodiments, the root cause is the first statement of the program code at which the random number is affected.

Such identification enables programmers to change the root cause such that the vulnerability of the random number generation to resource exhaustion decreases or stops. Such a change of the root cause may provide a more uniform generating of a random number.

Referring now to FIG. 1, a block diagram of a system for detecting the vulnerability of random number generation to resource exhaustion and for identifying a root cause in the program code for the vulnerability, in accordance with some exemplary embodiments will now be described.

System 100 includes a computerized device 107 configured for detecting the vulnerability of a program code to resource exhaustion and for identifying a root cause in the program code for the vulnerability.

Computerized device 107 includes memory 101, a communication module 102, a regression analysis module 103, a hooking module 104 and a processor 105. In some embodiments the computerized device is a server.

The hooking module 104 is configured for identifying statements in the program code at which a value of a variable associated with the random number is affected and for inserting a hooking code in the statements. The hooking code monitors the variable at the statement. The monitoring may include printing and storing the value of the variable in the memory 101.

The regression analysis module 103 is configured for performing regression analysis on a random number generated by the program code 1081. The regression analysis is configured for detecting vulnerability of the random number generation to resource exhaustion and for detecting a cause of the vulnerability. In the latter case, the regression analysis module 103 performs the regression analysis on the variables of each statement that is identified by the hooking module 104.

The processor 105 is configured for running the program code in a plurality of iterations wherein a consumption level of the resource is varied in each of the plurality of iterations. The processor 105 is also configured for comparing the entropy number of the random value to an expected level of entropy in order to detect the vulnerability of a program code to resource exhaustion and for identifying a root cause in the program code for the vulnerability.

In some embodiments, the computerized device 107 communicates with a plurality of other computerized devices 108 via the communication module 102 for receiving the program code 1081. In some other embodiments, program code 1081 is installed in the computerized device 107. The computerized device 107 may also communicate with the plurality of other computerized devices 108 via the communication module 102 for transmitting an indication of the vulnerability of the program code to resource exhaustion and for returning a pointer to the root cause of the vulnerability.

Figure 2:
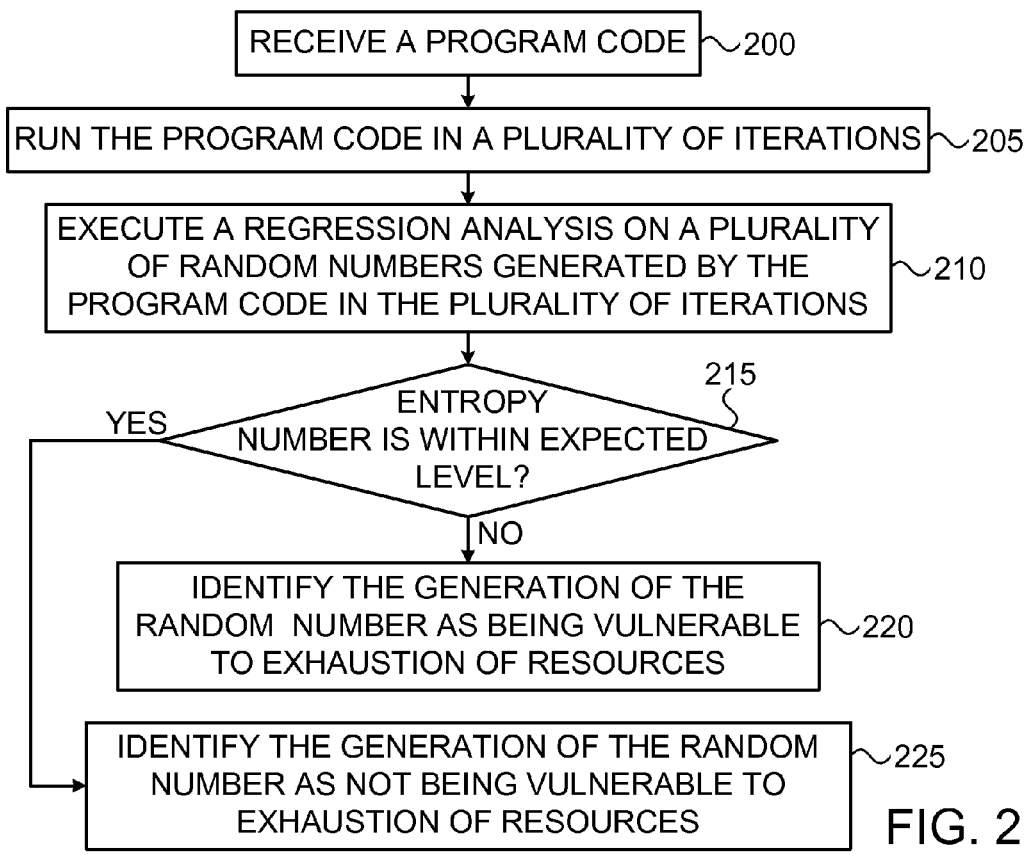
FIG. 2 shows a flowchart diagram of a method for detecting the vulnerability of random number generation to resource exhaustion, in accordance with some exemplary embodiments.

FIG. 2 shows a flowchart diagram of a method for detecting the vulnerability of random number generation to resource exhaustion, in accordance with some exemplary embodiments. The method is performed by a computerized device such as a server.

At block 200, the computerized device 107 receives a program code (e.g., 1081). The program code generates a random number. The generating of the random number may be associated with characteristics of the resource. Examples of such characteristics are parameters of a resource, rules of a resource and constraints of a resource; thus, the generating of the random number may be vulnerable to resource exhaustion. Examples of such a resource are memory, I/O port, a sensor and power resources. Examples of constraints related to the resources are total number of instances of the resource and number of available instances. An example of a parameter related to a resource is size of the memory.

In some embodiments, the random number is utilized for identifying an instance of a resource that has to be allocated. For example, the random number may identify a specific sensor from a plurality of sensors that are available for allocation.

At block 205, the computerized device 107 runs the program code in a plurality of iterations while varying the consumption level of the resource in the plurality of iterations in order to check the vulnerability of the random number generation to exhaustion of the resource. In some embodiments, the consumption level of the resource is increased in each of the plurality of iterations. In some embodiments, the computerized device 107 saves the random numbers that are generated by the iterations in a data repository.

At block 210, the computerized device 107 executes a regression analysis on a plurality of random numbers generated by the program code in the plurality of iterations. The regression analysis results in an entropy number.

At block 215, the computerized device 107 checks if the entropy number is within an expected level. The checking may be done by comparing the entropy level to a predefined threshold. Low entropy may indicate that the random number generation is vulnerable to exhaustion of the resource, while an entropy number that is higher or equal to the threshold may indicate that the random number generation is not vulnerable to exhaustion of the resource.

At block 220, which is performed if the entropy number is not within expected level, the computerized device 107 identifies the generation of the random number by the program code as being vulnerable to exhaustion of resources.

At block 225, which is performed if the entropy number is within expected level, the computerized device 107 identifies the generation of the random number by the program code as not being vulnerable to resource exhaustion.

Figure 3:
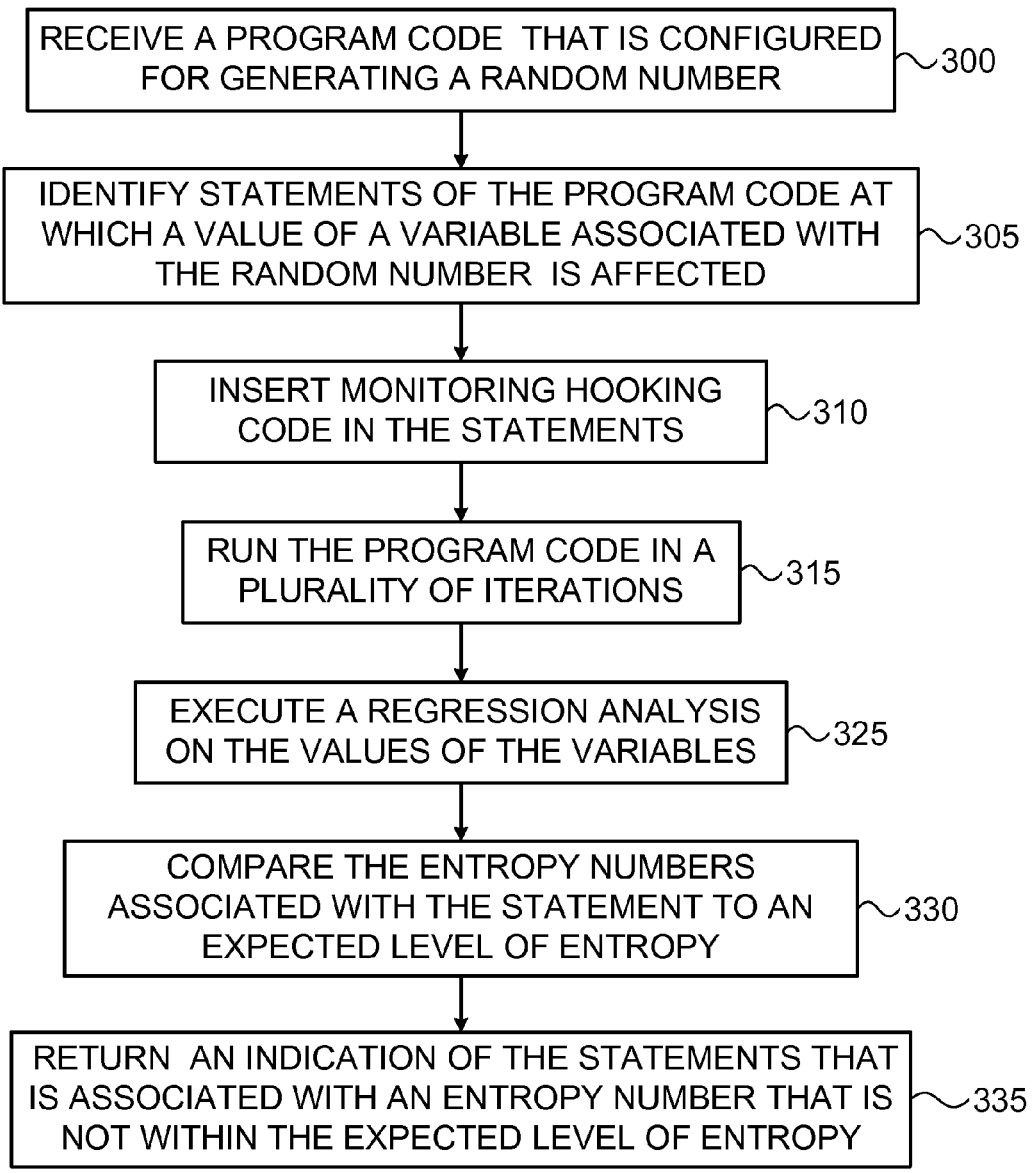
FIG. 3 shows a flowchart diagram of a method for identifying a root cause for the vulnerability of random number generation to resource exhaustion, in accordance with some exemplary embodiments.

FIG. 3 shows a flowchart diagram of a method for identifying a root cause for the vulnerability of random number generation to resource exhaustion, in accordance with some exemplary embodiments. At block 300, the computerized device 107 receives a program code (e.g., 1081) that is configured for generating a random number. The generation of the random number is identified as vulnerable to exhaustion of a resource. The process of the identifying the vulnerability to exhaustion of a resource is explained in greater detail in FIG. 2.

At block 305, the computerized device 107 identifies statements of the program code at which a value of a variable associated with the random number is affected. The variable is used by the program code for generating the random number. In some embodiments, the value is affected in a plurality of statements. For example, a first statement may include execution of a random number generator (where the random number generator is a computational or physical device designed to generate a sequence of numbers or symbols that lack any pattern); the second statement may convert the random number to a number that represents an actual number of a resource. For example, if the random number is from a range of 1 to 1000 and the range of the numbers of the resources is 10000 to 11000, the value 10000 is added to the number that is received in the first statement. In another example, N represents the number of available resources. If (N<1000), then the random number is uniformly chosen in the range 1 to N/10. Otherwise, the random number is uniformly chosen in the range 1 to N.

The identification of the statements at which a value of the variable is affected may be implemented by computing a static backward data slice (BS) from the statements in the program code. The static backward data slice includes all code statements in program code that may affect the value of the random number variable.

At block 310, the computerized device 107 inserts monitoring hooking code in the statements that were identified at 305. The hooking code is configured for monitoring the variable at the statements. In some embodiments, the hooking code is a function. In some embodiments, the monitoring is performed by storing the value of the variable in the memory 101. In some embodiments, if more than one statement is identified at 305 the monitoring is performed per each statement separately.

At block 315, the computerized device 107 runs the program code in a plurality of iterations. The consumption level of the resource is varied in the plurality of iterations. In some embodiments, the consumption level of the resource is increased. The computerized device 107 may simulate the variation in the consumption level or may actually consume the resource or cause another computerized device to consume the resource. For example, if the resource is memory, the computerized device 107 may simulate the increasing of the memory consumption or it may actually consume the memory 101 or cause other computerized devices to increase the consumption of the memory 101. During the running, the hooking code monitors a plurality of values of the variable in the plurality of iterations. If more than one statement is identified, the monitoring code monitors values of each statement separately.

At block 325, the computerized device 107 executes a regression analysis on the values. The regression analysis results in an entropy number. If more than one statement is identified, the computerized device 107 executes a regression analysis on values of a variable associated with each statement, resulting in a plurality of entropy numbers associated with the plurality of statements.

At block 330, the computerized device 107 compares the entropy numbers associated with the statements to an expected level of entropy. In some embodiments, the expected level of entropy is a predefined number. At block 335, the computerized device 107 returns an indication of the statement that is associated with an entropy number that is not within the expected level of entropy. In some embodiments, the indication is a pointer to the statement in the program code. Such an indication identifies a root cause of the vulnerability to exhaustion of the resource. The identifying of the root cause enables to improve the program code and to reduce or eliminate the vulnerability to exhaustion of the resource. In some embodiments, the computerized device 107 returns an indication of the first statement that is associated with an entropy number that is not within the expected level of entropy.

Figure 4:
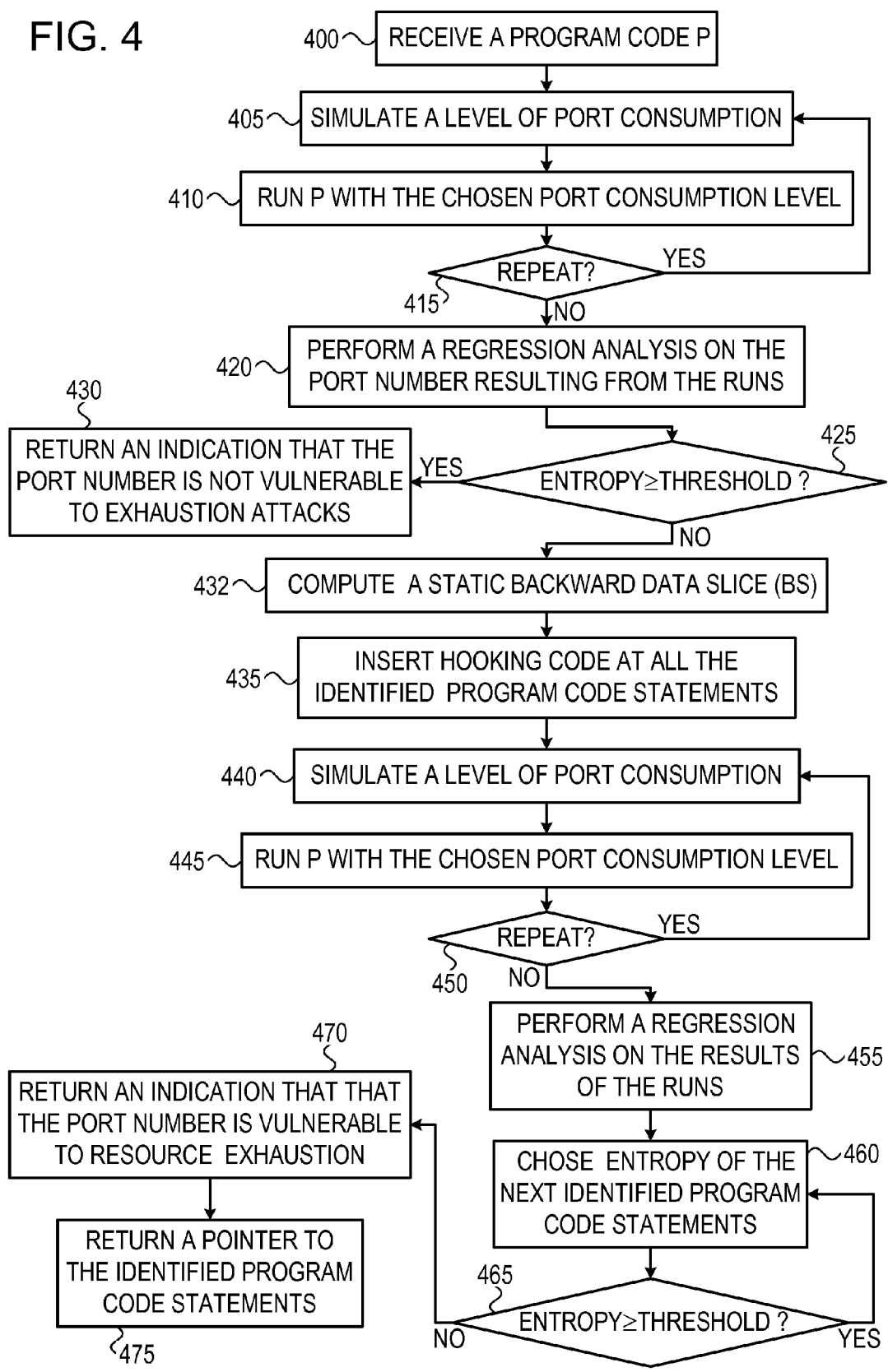
FIG. 4 shows a flowchart diagram of a scenario for detecting the vulnerability of port number generation to resource exhaustion and for identifying a root cause in the program code for the vulnerability, in accordance with some exemplary embodiments.

FIG. 4 shows a flowchart diagram of a scenario for detecting the vulnerability of port number generation to resource exhaustion and for identifying a root cause in the program code for the vulnerability, in accordance with some exemplary embodiments of the disclosed subject matter. At block 400, the computerized device 107 receives a program code P. The output of Program code P includes a port number which may be used for establishing a communication session. The Program code P includes lines in which the port number is generated. At blocks 405, 410 and 415, the computerized device 107 performs iterations of regression analysis. The regression analysis is configured for determining if the randomality of the port number that is generated by program code P is vulnerable to exhaustion of port consumption. At block 405, the computerized device 107 simulates a level of port consumption.

At block 410, the computerized device 107 runs program code P. The program code P chooses the port number according to the level of port consumption that is simulated at 405. In one example, the total number of ports is 100000. If the availability of the ports is higher than 30000, then the port number is generated by a random generator from a range of 100000 numbers, while if the availability of the resources is lower then 30000, the port number is generated by a random generator from a range of 1000 numbers only. At block 415, the computerized device 107 checks if a next iteration is required. The check is performed by comparing the number of iteration to a total number of iterations. The total number of iterations may be a predefined number.

If another iteration is required, then the operation resumes to 405, otherwise, at block 420, the computerized device 107 performs a regression analysis on the port number resulting from the runs. The output of the regression analysis includes an entropy number. The entropy number identifies the distribution of the generated port numbers as a function of the level of resource consumption.

At block 425, the computerized device checks if the entropy number is less than a threshold.

If the entropy is greater than a threshold or equal to the threshold then, at block 430, the computerized device 107 returns an indication that the entropy of the port number that program code P generates is not vulnerable to resource exhaustion.

Otherwise, the computerized device 107 detects that the generation of the port number that application program is vulnerable to resource exhaustion and checks the root cause of the entropy.

At block 432, the computerized device 107 computes a static backward data slice (BS) for identifying program code statements P which affects the value of the random number. Examples of such code program code statements are:

<1> If number of available ports>30000
<2> generate a random number from a range of 100000
<3> port number=random number
<4> otherwise/*number of available ports<=30000*/
<5> generate a random number from a range of 1000
<6> port number=random number At block 435, the computerized device 107 inserts hooking code at all the identified program code statements. The hooking code is configured for monitoring the value of port number. For example, the program code may be changed as follows:

<1> If number of available ports>30000
<2> generate a random number from a range of 100000
<3> port number=random number
<4> save value of port number
<5> save a pointer to program code statement 3
<6> otherwise/*number of available ports<=30000*/
<7> generate a random number from a range of 1000
<8> port number=random number
<9> save value of port number
<10> save a pointer to program code statement 8

Thus, new program code statements <4>, <5>, <8> and <9> are inserted.

At 440, 445 and 450, the computerized device runs program P for identifying program code statements in which the value of the port number becomes vulnerable to port consumption. At block 440, the computerized device 107 simulates a level of port consumption. In the exemplary scenario, the level of port consumption increases in each iteration, and the simulation is performed by activating another program that consumes the required number of ports. At block 445, the computerized device 107 runs program code P. The program code P generates the port number in accordance with the level of port consumption that is simulated at 440.

At block 450, the computerized device 107 checks if a next iteration is required. The checking may be done by comparing the number of iterations that have been performed to a total number of iterations. The total number of iterations may be a predefined number. If other iteration is required then the operation resumes to 440, otherwise, at 455, the computerized device 107 performs regression analysis per each value of the port number at each of the identified program code statements. The output of each regression analysis includes an entropy number. The entropy number identifies the distribution of the value of the port number at the associated program code statements as a function of the level of resource consumption.

At blocks 460 and 465, the computerized device 107 checks the entropy numbers associated with the statements, starting from the entropy number associated with the first statement. At block 460, the computerized device 107 chooses the entropy number associated with the current statement. At block 465, the computerized device 107 compares the chosen entropy number to a predefined threshold. If the entropy number is greater than a threshold or equal to a threshold, then the operation of computerized device 107 resumes to block 460; otherwise at block 470, the computerized device 107 returns an indication that the generation of the port number is vulnerable to resource exhaustion and, at block 475, the computerized device 107 returns the pointer to the current statement.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for managing resource exhaustion, the method comprising:
   receiving a program code that is configured for generating a random number, the generating being identified as vulnerable to a resource exhaustion;
   identifying a statement in the program code at which a value of a variable associated with the generating of the random number is affected;
   inserting a hooking code in the statement, the hooking code configured for monitoring the variable at the statement;
   running the program code in a plurality of iterations, wherein a consumption level of the resource is varied in the plurality of iterations;
   monitoring, by the hooking code, a plurality of values of the variable in the plurality of iterations, as a result of the running;
   executing a regression analysis on the plurality of values, the regression analysis resulting in an entropy number, the regression analysis configured to evaluate distribution of the random number as a function of the consumption level;
   comparing the entropy number to an expected level of entropy; and
   returning an identification of the statement as a result of identifying the entropy number as being not within the expected level of entropy, thereby returning a root cause of the vulnerability.

2. The computer implemented method of claim 1, wherein the identification of the statement is a pointer.

3. The computer implemented method of claim 1, wherein the identification of the statement is an identification of a first statement of a plurality of statements in the program code at which a value of the variable associated with the random number is affected.

4. The computer implemented method of claim 1, wherein the identifying of the statement in the program code further comprises computing a static backward data slice (BS) from statements in the program code.

5. A computer-implemented method for managing resource exhaustion, the method comprising:
   receiving a program code that is configured for generating a random number, the generating being associated with a characteristic of a resource;
   running the program code in a plurality of iterations, wherein a consumption level of the resource is varied in the plurality of iterations;
   executing a regression analysis on a plurality of random values generated in the plurality of iterations, the regression analysis resulting in an entropy value the regression analysis configured to evaluate distribution of the random number as a function of the consumption level;
   comparing the entropy value to an expected level of entropy; and
   identifying the generation of the random number as being vulnerable to exhaustion of the resource as a result of identifying the entropy value as not being within the expected level of entropy.

6. The computer implemented method of claim 5, wherein the characteristic of the resource is at least one of: parameters associated with a resource, rules associated with the resource, and constraints associated with the resource.

7. The computer implemented method of claim 5, further comprising identifying the generation of the random number as not being vulnerable to exhaustion of the resource as a result of identifying the entropy value as being within the expected level of entropy.

8. A computer program product for managing resource exhaustion, the computer program product comprising a non-transitory computer readable storage medium having program code embodied therewith, the program code executable by a computer to perform a method, the method comprising:
   receiving a program code that is configured for generating a random number, the generating being identified as vulnerable to a resource exhaustion;
   identifying a statement in the program code at which a value of a variable associated with the generating of the random number is affected;
   inserting a hooking code in the statement; the hooking code configured for monitoring the variable at the statement;
   running the program code in a plurality of iterations, wherein a consumption level of the resource is varied in the plurality of iterations;

monitoring a plurality of values of the variable in the plurality of iterations, as a result of the running;

executing a regression analysis on the plurality of values, the regression analysis resulting in an entropy number, the regression analysis configured to evaluate distribution of the random number as a function of the consumption level;

comparing the entropy number to an expected level of entropy; and returning an identification of the statement as a result of identifying the entropy number as being not within the expected level of entropy; thereby returning a root cause of the vulnerability.

9. The computer-implemented method of claim 5, wherein the expected level of entropy is a predefined threshold value; wherein:

when the level of entropy is below the predefined threshold value, the random number generated is determined to be vulnerable to exhaustion of the resource; and when the level of entropy is equal to or greater than the predefined threshold value, the random number generated is determined not to be vulnerable to exhaustion of the resource.

10. The computer-implemented method of claim 6, wherein the constraints include at least one of a total number of instances of the resource, and a number of available instances of the resource.

11. The computer-implemented method of claim 1, wherein the random number identifies a selected sensor from a plurality of sensors available for allocation.

12. The computer-implemented method of claim 1, wherein the identifying a statement in the program code includes identifying a plurality of statements in the program code at which values of the variable is affected;

wherein a first statement of the plurality of statements includes a random number generator; and a second statement of the plurality of statements converts the random number to a number that represents an actual number of the resource.

13. The computer-implemented method of claim 1, wherein the identifying a statement in the program code includes identifying a plurality of statements in the program code at which values of the variable is affected;

wherein executing the regression analysis includes executing the regression analysis on each of the plurality of values, resulting in a plurality of entropy numbers.

14. The computer-implemented method of claim 1, wherein output of the program code includes a port number used to establish a communication session, the program code including lines in which the port number is generated;

wherein the the running the program code includes selecting the port number according to a level of simulated port consumption.

* * * * *